April 20, 1965     O. E. COE     3,178,787
BELT BUCKLE
Filed July 25, 1963
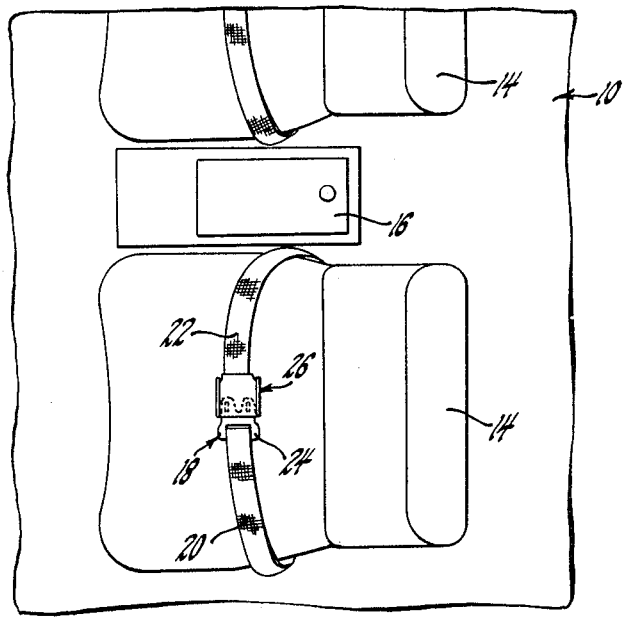
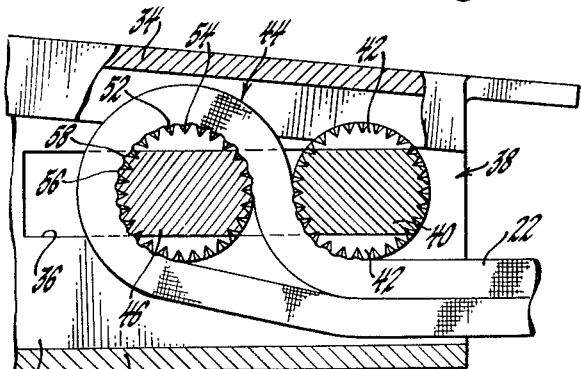
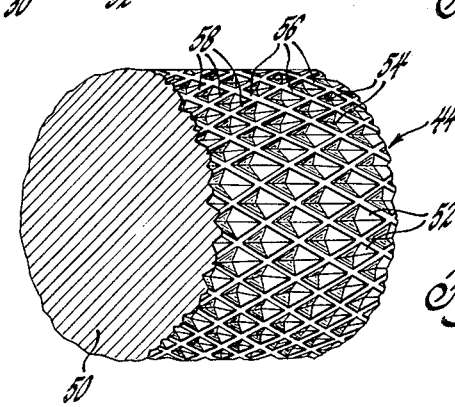
INVENTOR.
Orson E. Coe
BY
Barnard, McGlynn & Leising
ATTORNEYS United States Patent Office 3,178,787
Patented Apr. 20, 1965

3,178,787
BELT BUCKLE
Orson E. Coe, 148 E. Washington, Ionia, Mich.
Filed July 25, 1963, Ser. No. 297,577
6 Claims. (Cl. 24—196)

This invention relates to safety seat belt assemblies and, in particular, to an improved means for adjustably connecting one end of a length of flexible safety belting to an associated buckle adapted to receive a latch plate for retaining a passenger within a vehicle seat.

Safety seat belt assemblies heretofore devised for use in association with the seats of various types of vehicles to retain the occupants therein have typically included a buckle including a latching mechanism adapted to releasably latchingly engage with a latch plate. The buckle and the latch plate have been respectively suitably secured to the ends of two lengths of flexible safety belting, the other ends of which have been suitably anchored as to the floor of the vehicle in question. Typically, the buckle has been adjustably mounted to the end of its associated length of belting to enable adjustment of the entire seat belt assembly in accordance with the girth of various passengers who may occupy the associated seat.

To this end, one typical buckle assembly comprises a snubbing pin or bar mounted on the frame of the buckle in a fixed position and a locking pin or bar which is slidable toward and away therefrom. Thus, a length of the unanchored end of the associated belting may be passed around the locking pin or bar and between the latter and the snubbing pin or bar whereby tensile force applied to the belting causes the locking pin or bar to move toward the snubbing pin or bar to grip a portion of the belting therebetween and hold the buckle securely in position on the end of the belting. On the other hand, the slidable locking pin or bar may be manually moved away from the snubber pin or bar to permit the belting to be adjusted along and about the locking pin or bar to fit the girth of the person involved.

The aforementioned locking and snubbing pins or bars have been substantially identical in comprising a cylindrical solid metal body portion having a conventionally knurled outer surface which forms the gripping surface for the belting as aforementioned. In the manufacture of such knurled pins or bars, a piece of cylindrical metal stock having a substantially smooth external surface is worked upon by a suitable tool to cut a first series of substantially parallel narrow grooves therein which twist along the external surface of the body of the pin or bar between the ends thereof. In similar fashion, a second series of a plurality of substantially parallel narrow grooves are cut in the external cylindrical surface of the pin or bar between the ends thereof and so as to twist in an opposite direction, whereby the grooves of each series thereof intersect each other and, between the four points of intersection of each adjacent pair of the grooves of each series thereof, form relatively undisturbed external portions of the body which are generally diamond-shaped in configuration. Thereafter, the safety belting is adjustably wrapped about or against the gripping surface formed by these grooves and the diamond-shaped undisturbed cylindrical portions of the pins or bars.

Apparently due to the fact that the diamond-shaped portions of such a knurled pin or bar have relatively sharp edges where they join the aforementioned grooves, the safety belt webbing gripped by such a surface becomes badly frayed and weakened in use. In this regard, it is to be noted that the length of the belt webbing is repeatedly pulled to and fro about the aforementioned locking pin or bar and against at least a portion of the knurled gripping surface of the snubbing pin or bar while adjusting the belting in use. In any event, repeated adjustments of the belt webbing on the buckle and about the knurled gripping surfaces of the locking and snubber pins or bars frays the webbing material, thereby weakening the latter so as to become after a period of use incapable of withstanding the tensile loads for which it was designed.

In view of the foregoing considerations, the present invention includes among its objects the provision of an improved pin or bar comprising a solid metal body, preferably circular in cross section and of cylindrical external configuration, and a plurality of inverted knurls formed in the external surface thereof and acting as a gripping surface for flexible belting and the like weaved therearound or about.

More specifically, it is an object and feature of this invention to provide a buckle and belt assembly comprising, in combination, a buckle frame including relatively movable locking and snubbing pins or bars carried thereby to receive in conventional adjustable fashion one end portion of a length of flexible safety seat belting, the external gripping surfaces of the respective pins or bars being provided by a plurality of small discrete depressions extending radially inwardly from the exterior surfaces thereof and being disposed immediately adjacent and relative to each other to form a first and second series of a plurality of substantially parallel narrow continuous ribs extending along the external surfaces of the pins or bars between the ends thereof, the respective series of ribs twisting about the lengths of the pins or bars in opposite directions between the ends thereof and intersecting each other with each of the aforementioned depressions located between the four points of intersection of each adjacent pair of the ribs of the respective series thereof.

These and other objects, features and advantages of the invention will appear more fully hereinafter as the description thereof proceeds, reference being made to the drawing in which:

FIGURE 1 is a fragmentary top plan view of the interior of a vehicle passenger compartment, and illustrates a preferred form of the buckle assembly of this invention;

FIGURE 2 is an enlarged view of a fragmentary portion of FIGURE 1, partially broken away and in section, to illustrate certain details of the buckle and belt assembly;

FIGURE 3 is a further enlarged fragmentary sectional view taken on line 3—3 of FIGURE 2; and FIGURE 4 is a fragmentary perspective view of a portion of a locking pin or bar associated with the buckle assembly, which pin or bar is substantially identical to snubbing pin or bar thereof.

Referring now to the drawings, and particularly FIGURE 1 thereof, the numeral 10 generally indicates the interior of a vehicle passenger compartment including the floor 12, a pair of laterally spaced vehicle seats 14, a conventional console or storage compartment 16 disposed therebetween and a safety seat belt assembly indicated generally at 18, it being understood that one such assembly will be associated with each seat.

According to conventional practice, each of the seat belt assemblies 18 comprises the two lengths of flexible belting 20 and 22, made of a suitable natural or synthetic material or fabric to withstand the loads involved, with one end of each of the lengths of belting suitably anchored in a conventional manner as to the floor 12 of the vehicle while the other ends thereof respectively carry the latch plate 24 and buckle assembly indicated generally at 26. Conventionally, the end of the belting 20 connected to the latch plate 24 is connected to the latter by sewing, as indicated at 28 in FIGURE 2, a loop extending through the latch plate which, in and of itself, forms no part of the present invention and is of conventional construction. Furthermore, the buckle assembly 26 will include a latching mechanism cooperably engageable with the latch plate 26 to releasably latch the two together in the relationship illustrated in FIGURES 1 and 2. However, the details of such a latching mechanism and its coaction with the latch plate does not, in and of itself, form any part of the present invention, and the specific form of the latch plate and the buckle insofar as this latching cooperation is concerned is immaterial to the invention. Consequently, the details of such a latching mechanism have been eliminated from the drawings in order not to obscure the invention. In this regard, however, the buckle assembly and latching mechanism, except for the components of the buckle assembly cooperating with the belting 22 to adjustably mount the buckle thereon as to be described, are preferably constructed in accordance with the U.S. patent to Harold P. Phillips and Lesle W. Cook, No. 2,869,200, issued January 20, 1959 and entitled "Quickly Releasable Buckle Device."

The buckle assembly 26 comprises a buckle frame including the laterally spaced parallel side walls 30 upstanding from the opposite edges of a floor member 32. A cover and latch release plate 34 overlies the floor member 32 in spaced relation thereto and extends between the side walls 30 in a manner and for a purpose as illustrated in the U.S. patent aforementioned. Thus, the buckle structure so far described is generally rectangular in transverse cross section to define an opening at one end thereof to receive the latch plate 24 and an opening at the other end thereof between side walls 30, floor member 32 and cover and latch release plate 34 to receive one end of the flexible belting 22.

A longitudinally elongated slot 36 is provided in each side wall 30 in parallel relation to each other and generally midway between the floor member 32 and the cover plate 34. A snubber pin or bar indicated generally at 38 includes opposite end portions 40 which are flattened or otherwise formed to a cross sectional configuration generally corresponding to that of the slots 36 so as to be received therein at the rearward end thereof. In this regard, with reference to FIGURES 2 and 3, it may be noted that the snubber pin or bar includes surfaces 42 adjacent to and above and below one end portion 40 thereof, which surfaces extend obliquely and non-perpendicularly as illustrated in FIGURE 2 to the axis of the pin or bar. Thus, in assembling the snubber pin or bar within the buckle frame, the other end portion 40 thereof may first be seated within the slot 36 in the associated side wall by canting the axis of the snubber pin or bar 38 between the side walls. Thereafter, the other end portion 40 of the snubber bar associated with surfaces 42 may be pivoted about the one end thereof and into its associated slot, the oblique surfaces 42 providing the necessary clearance for this purpose. Once the snubber pin or bar is in position as illustrated in FIGURE 2, the laterally outermost portions of the oblique surfaces 42 will engage the inner surface of the associated side wall 30 to lock the snubber pin or bar in position at the rearward end of the slots 36.

A locking pin or bar indicated generally at 44 also extends laterally between the side walls 30, and includes end portions 46 suitably shaped for free sliding movement within respective slots 36, rivets or head members 48 being provided on the laterally outermost portions of the respective ends of the snubber pin or bar to maintain the latter on the buckle frame, and for manipulation in the user's fingers along the slots 36 during adjustment of the belting as will be described.

The respective gripping surfaces of the snubber and locking pins or bars 38 and 44 are identical. Hence, reference will be made to the details of the locking pin or bar 44 in this regard, and as is shown additionally in FIGURE 4. Thus, the locking pin or bar includes a solid cylindrical metal body portion 50 extending between the end portions 46 thereof and between the side walls 30 of the buckle frame. The external gripping surface of the locking pin or bar is formed by a plurality of relatively small depressions 52 suitably formed to extend radially inwardly from the external generally cylindrical surface of the body portion 50. As shown, each such depression takes the form of an inverted pyramidal tetrahedron having an apex 54 and generally diamond-shaped base opposite thereto. The size and relative spacing of the respective depressions 52 are such as to define a first and second series of substantially parallel narrow continuous ribs 56 and 58, respectively, extending endwise along the body portion 50 of the pin or bar. As will be readily apparent from the drawings, the first series of ribs 56 twist about the length of the pin or bar between the ends thereof in one direction, while the second series of ribs 58 twist in the opposite direction. Furthermore, respective ones of the depressions 52 are located between the respective four points of intersection of each adjacent parallel pair of the first series of ribs with each adjacent parallel pair of the second series of ribs. As will also be apparent, the various ribs of each series thereof may constitute unworked external portions of the pin or bar stock; that is, the locking pin or bar may be formed from a length of stock in which body portion 50 initially has a generally smooth cylindrical outer surface which is then acted upon by suitable tools to form the depressions 52 whereby the unworked portions of the external surface of the bar define the aforementioned series of parallel ribs having relatively smooth flat narrow continuous surfaces.

As will be particularly apparent from FIGURE 3, the free end of the belting 22 remote from the anchored end thereof is connected to the buckle in a conventional manner; that is, it extends through the aforementioned opening in one end of the buckle frame adjacent the floor, is wrapped clockwise in FIGURE 3 around the gripping surface of the locking pin or bar 44, between the latter and the gripping surface of the snubbing pin or bar 38, and then between the latter and the length of belting initially entering the buckle frame. Thus, the locking pin or bar 44 may be manually moved away from the snubbing pin or bar 38 to free the belting, at which time the latter may be pulled in either direction so as to slide around the outer gripping surface of the locking pin or bar until the desired length of the belting 22 between its anchor and the buckle is reached. At this time, the locking pin or bar may be released, and a tensile force applied to the belting causes the locking pin or bar to move toward the snubber pin or bar and to the position particularly illustrated in FIGURE 3. At this time, the belting is grippingly engaged between the respective gripping surfaces of the locking and snubbing pins or bars. Consequently, any increase in tension applied on the belting, as with the buckle and latch plate assembled in an operative relationship as illustrated in FIGURE 1, only serves to further tighten the connection of the belting to the buckle.

As is indicated in FIGURE 3, with the respective pins or bars grippingly engaging the belting, the latter is at least partially pinched into the cooperating depressions 52 in the respective pins or bars to provide the gripping action. However, during adjustment of the length of the belting as aforedescribed, the belting smoothly rides on the flat surfaces of the respective series of ribs 56 and 58 to minimize any fraying action on the belting.

While but only one form of the invention has been shown and described, other forms will now be readily apparent to those acquainted with this art. Therefore, it will be understood that the embodiment shown in the drawings and described above is merely for illustrative purposes, and is not intended to limit the scope of the invention which is defined by the claims which follow.

I claim:

1. A buckle and belt assembly comprising, in combination, a buckle frame, a snubber pin mounted on said frame, a locking pin mounted on said frame for movement toward and away from said snubber pin, at least one of said pins including a plurality of depressions in the exterior surface thereof, a first and second series of a plurality of ribs extending along the external surface of said one pin, said respective series of ribs intersecting each other with respective ones of said depressions located between the respective points of intersection of each adjacent pair of said ribs of said respective series thereof to form a gripping surface on the external surface of said one pin, and a length of flexible belting extending about said locking pin and between the latter and said snubber pin whereby tension applied to said belting draws said locking pin toward said snubber pin to grip said belting therebetween and against said gripping surface.

2. A buckle and belt assembly comprising, in combination, a buckle frame, a snubber pin mounted on said frame, a locking pin mounted on said frame for movement toward and away from said snubber pin, at least one of said pins including a plurality of small discrete depressions in the exterior surface thereof, a first and second series of a plurality of continuous ribs extending along the external surface of said one pin, said respective series of ribs intersecting each other with respective ones of said depressions located between the respective points of intersection of each adjacent pair of said ribs of said respective series thereof to form a gripping surface on the external surface of said one pin, and a length of flexible belting extending about said locking pin and between the latter and said snubber pin whereby tension applied to said belting draws said locking pin toward said snubber pin to grip said belting therebetween and against said gripping surface.

3. A buckle and belt assembly, comprising, in combination, a buckle frame, a snubber pin including a solid cylindrical body mounted on said frame, a locking pin including a solid cylindrical body mounted on said frame for movement toward and away from said snubber pin, at least one of said pins including a plurality of small discrete depressions extending radially inwardly from the exterior surface of the body thereof, a first and second series of a plurality of substantially parallel narrow continuous ribs extending along the external surface of the body of said one pin, said respective series of ribs intersecting each other with respective ones of said depressions located between the respective points of intersection of each adjacent pair of said ribs of said respective series thereof to form a gripping surface on the external surface of the body of said one pin, and a length of flexible belting extending about said locking pin and between the latter and said snubber pin whereby tension applied to said belting draws said locking pin toward said snubber pin to grip said belting therebetween and against said gripping surface.

4. A buckle and belt assembly comprising, in combination, a buckle frame, a snubber pin mounted on said frame and including a solid cylindrical metal body, a locating pin mounted on said frame for movement toward and away from said snubber pin and including a solid cylindrical metal body, each of said pins including a plurality of small discrete depressions extending radially inwardly from the exterior surface of the body thereof, a first and second series of a plurality of substantially parallel narrow continuous ribs extending along the external surface of the body of said respective pins between the ends thereof, said respective series of ribs twisting in opposite directions about the length of the body of said respective pins between the ends thereof and intersecting each other with respective ones of said depressions located between the respective points of intersection of each adjacent pair of ribs extending along the external surface of the body of said respective pins, and a length of flexible belting extending into said buckle frame about said gripping surface of said locking pin and between the latter and said gripping surface of said snubber pin whereby tension applied to said belting draws said locking pin toward said snubbing pin to grip said belting between said gripping surfaces of said respective pins.

5. A buckle and belt assembly comprising, in combination, a buckle frame including laterally spaced side walls each having an elongated slot therein, a solid cylindrical metal snubber pin extending laterally between said side walls and having the opposite ends thereof mounted in one end of said respective slots, a solid cylindrical metal locking pin extending laterally between said side walls and having the opposite ends thereof mounted in said respective slots for sliding movement therein toward and away from said snubber bar, each of said pins including a plurality of small discrete depressions extending radially inwardly from the exterior surfaces thereof and being disposed immediately adjacent and relative to each other to form a first and second series of a plurality of substantially parallel narrow continuous ribs extending along the external surfaces of said respective pins between said ends thereof, said respective series of ribs twisting in opposite directions about the lengths of said respective pins between said ends thereof and intersecting each other with each of said depressions located between the points of intersection of each adjacent pair of said ribs of said respective series thereof to form gripping surfaces on the external surfaces of said respective pins, and a length of flexible belting extending into said buckle frame between said side walls thereof, about said gripping surface of said locking pin and between the latter and said gripping surface of said snubber pin, whereby tension applied to said belting draws said locking pin toward said snubber pin to grip said belting between said gripping surfaces of said respective bars.

6. A buckle and belt assembly comprising, in combination, a buckle frame including snubber means, a locking pin mounted on said frame for movement toward and away from said snubber means, said pin including a plurality of depressions in the exterior surface thereof, a first and second series of a plurality of ribs extending along the external surface of said pin, said respective series of ribs intersecting each other with respective ones of said depressions located between the respective points of intersection of each adjacent pair of said ribs of said respective series thereof to form a gripping surface on the external surface of said pin, and a length of flexible belting extending about said pin and between the latter and said snubber means whereby tension applied to said belting draws said pin toward said snubber means to grip said belting therebetween and against said gripping surface.

References Cited by the Examiner
UNITED STATES PATENTS

| | | | |
|---|---|---|---|
| 1,380,932 | 6/21 | Shreve | 24—244 |
| 1,802,003 | 4/31 | Connelly. | |
| 1,850,944 | 3/32 | Sanders | 24—194 |
| 1,911,592 | 5/33 | Supligeau | 29—121 |
| 2,393,529 | 1/46 | Harrigan. | |
| 2,803,864 | 8/57 | Bishaf | 24—196 |
| 2,958,902 | 11/60 | Decker | 18—21 |
| 2,977,655 | 4/61 | Peters | 24—196 |

DONLEY J. STOCKING, *Primary Examiner.*